UNITED STATES PATENT OFFICE.

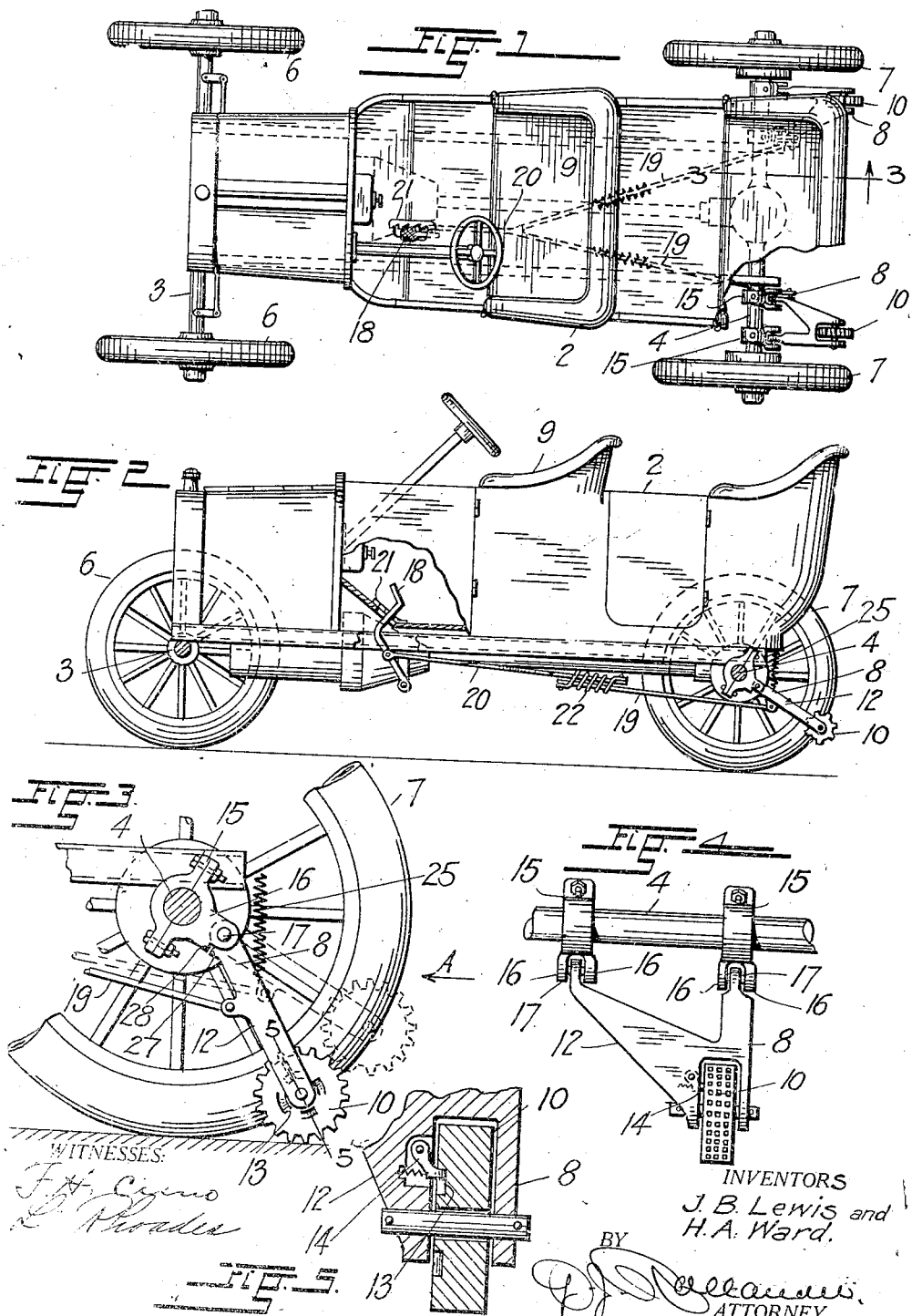

JOHN B. LEWIS AND HEBER A. WARD, OF DENVER, COLORADO, ASSIGNORS OF ONE-THIRD TO WILLIAM A. LIPSCOMB, OF DENVER, COLORADO.

MOTION-RESTRAINING ATTACHMENT FOR VEHICLES.

1,189,143.  Specification of Letters Patent.  Patented June 27, 1916.

Application filed March 17, 1915. Serial No. 14,896.

*To all whom it may concern:*

Be it known that we, JOHN B. LEWIS and HEBER A. WARD, citizens of the United States, residing at Denver, in the county of Denver and State of Colorado, have invented certain new and useful Improvements in Motion-Restraining Attachments for Vehicles, of which the following is a specification.

This invention relates to an appliance for preventing skidding and uncontrolled backward motion of vehicles, and its primary object resides in the provision of a mechanism of simple construction which when attached to an automobile or other vehicle, may be readily adjusted by an occupant of the same to effectively perform one or both of the above-mentioned functions.

An embodiment of our invention is shown in the accompanying drawings in the various views of which like parts are similarly designated, and in which—

Figure 1 is a plan view of a motor driven vehicle to which our invention is applied, Fig. 2, a partially sectional side elevation of the same, Fig. 3, a fragmentary section along the line 3—3, Fig. 1, drawn to an enlarged scale, Fig. 4, a rear elevation of the parts shown in Fig. 3, looking in the direction of the arrow A, and Fig. 5, an enlarged section taken along the line 5—5, Fig. 3.

The vehicle shown in Figs. 1 and 2 of the drawings comprises in connection with the body 2, front and rear axles 3 and 4 on which the road wheels 6 and 7 are rotatably mounted.

Our appliance for preventing skidding of the wheels of a vehicle on slippery surfaces and for arresting rearward movement of the same on inclined roads, comprises a drag element which in its preferred form is composed of a pair of coöperative members 8. The two drag members are mounted on the rear axle 4 of the vehicle adjacent its wheels and in connection with an adjusting mechanism the operative element of which is positioned in proximity to the driver's seat 9 on the vehicle body.

Each of the drag members 8 comprises a peripherally toothed wheel 10 which is rotatably mounted on a bifurcated arm 12 which at the ends of its divergent members is pivotally connected with the axle 4. The wheel 10 has in one of its faces a circular series of ratchet teeth 13 for engagement with a spring-controlled pawl 14 which is operatively disposed in a recess of the arm 12 on which the wheel is mounted. The pawl by engagement with the ratchet teeth, prevents reverse motion of the wheel when the vehicle with which the appliance is connected, moves rearwardly, thereby adapting the drag element to impede the rearward movement of the vehicle by the engagement of the teeth of the nonrotatable wheels of its members with the ground. The pivotal connection of the drag members with the axle 4 is established through the medium of collars 15 which are fixed on the axle. Each of the collars is composed of two complementary parts which are connected by means of bolts to clampingly engage the axle. The collars are each provided with a pair of lugs 16 which are spaced to receive between them the extremities of the bifurcated arms 12 with which they are articulately connected by means of pivot pins 17. Each of the drag members 8 is thus pivotally connected with the axle by two collars, the parts being positioned with relation to the axle so that when the arms move downwardly about their pivotal axes, the wheels at their outer extremities will engage the ground at points rearward of the axle as shown in Fig. 3.

When under ordinary conditions the services of the motion restraining appliance are not required, the drag members are held in an elevated position as shown in Fig. 2, and, in broken lines, in Fig. 3 of the drawings, by means of an adjusting mechanism which as stated hereinbefore includes an operating member in convenient adjacency to the driver's seat of the vehicle. In the construction shown in the drawings, this operative member consists of a foot lever 18 which is connected with the two members 8 by means of a pair of convergent rods 19 which are united at the point of their convergence into a single rod 20 for their connection with the lever. Suitable means such as a ratchet-toothed plate 21 shown in Fig. 1, is provided for locking the lever in its adjusted positions. Each of the rods 19 is rendered longitudinally resilient by being composed of two lapping parts which are connected by a coiled spring 22.

When the drag element is in its operative condition in engagement with the ground as shown in full lines in Fig. 3, the foot lever 21 is fixed in one of its adjusted positions on the plate 21, whereby to render the element effective for restraining the road wheels of the vehicle from lateral displacement on slippery roads, or for impeding rearward movement of the vehicle on inclined surfaces. The springs 22 on the rods are under these conditions, of value in absorbing road shocks, and thereby preventing breakage of the parts when the wheels at the ends of the members 8, encounter rocks or other obstructions.

Shoulders 27 on the arms A limit by engagement with stops 28 on the respective collars 15, the downward movement of the arms and by connecting the arms with a fixed part of the vehicle by means of springs 25, they are more firmly held in the raised position and they are automatically returned to the said position when the lever 18 is released.

Having thus described our motion-restraining appliance in the best form at present known to us, we desire it understood that variations in the construction and arrangement of its parts may be resorted to within the spirit of our invention as expressed in the appended claim.

The drag members 8 may, for example, be lightened by the omission of one of the divergent parts of the arms 12 on which the wheels 10 are mounted, and the adjusting mechanism must necessarily be varied in accordance with the size, character and construction of the vehicle to which the invention is applied.

Having thus described our invention what we claim and desire to secure by Letters-Patent is:

Apparatus of the character described comprising an arm having means for its pivotal connection with a vehicle, a wheel rotatable on the said arm and having in its side a concentric series of ratchet shaped depressions, and a pawl in a recess of the arm, engaging said depressions for preventing rotation of the wheel in one direction.

In testimony whereof we have affixed our signatures in presence of two witnesses.

JOHN B. LEWIS.
HEBER A. WARD.

Witnesses:
G. J. ROLLANDET,
L. RHOADES.